US011968578B2

(12) United States Patent
Akl et al.

(10) Patent No.: US 11,968,578 B2
(45) Date of Patent: Apr. 23, 2024

(54) TECHNIQUES FOR ASSOCIATING INTEGRATED ACCESS AND BACKHAUL (IAB) NODES WITH DIFFERENT UPSTREAM NODES

(71) Applicant: QUALCOMM Incorporated, San Diego, CA (US)

(72) Inventors: Naeem Akl, Somerville, NJ (US); Karl Georg Hampel, Hoboken, NJ (US); Ozcan Ozturk, San Diego, CA (US); Navid Abedini, Basking Ridge, NJ (US); Jianghong Luo, Skillman, NJ (US); Luca Blessent, Whitehouse Station, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 175 days.

(21) Appl. No.: 17/357,631

(22) Filed: Jun. 24, 2021

(65) Prior Publication Data
US 2021/0410031 A1 Dec. 30, 2021

Related U.S. Application Data

(60) Provisional application No. 63/045,793, filed on Jun. 29, 2020.

(51) Int. Cl.
*H04W 36/08* (2009.01)
*H04B 7/155* (2006.01)
(Continued)

(52) U.S. Cl.
CPC ........... *H04W 36/08* (2013.01); *H04W 36/12* (2013.01); *H04W 74/0833* (2013.01);
(Continued)

(58) Field of Classification Search
CPC . H04W 36/08; H04W 36/12; H04W 74/0833; H04W 76/14; H04W 84/042;
(Continued)

(56) References Cited

U.S. PATENT DOCUMENTS

2019/0253966 A1* 8/2019 Park ................... H04L 5/0091
2019/0350023 A1* 11/2019 Novlan ................ H04W 76/14
(Continued)

FOREIGN PATENT DOCUMENTS

CA 3060836 A1 * 5/2020 .......... H04W 72/042
EP 3787343 A1 3/2021
(Continued)

OTHER PUBLICATIONS

International Search Report and Written Opinion—PCT/US2021/039212—ISA/EPO—dated Nov. 8, 2021.
(Continued)

*Primary Examiner* — Hassan Kizou
*Assistant Examiner* — Oladiran Gideon Olaleye
(74) *Attorney, Agent, or Firm* — Arent Fox LLP/Qualcomm Incorporated

(57) ABSTRACT

Aspects described herein relate to receiving, by a mobile termination (MT) function of an integrated access and backhaul (IAB) node, a first indication to migrate from a first IAB donor node associated with a first cell group and a first central unit (CU) to a second IAB donor node associated with a second cell group and a second CU, performing, by the IAB node and based at least in part on receiving the first indication, a first random access procedure to connect to the second cell group associated with the second IAB donor node, establishing, by the IAB node in addition to a first distributed unit (DU) function of the IAB node that serves a
(Continued)

third cell group and based on performing the first random access procedure, a second DU function that serves a fourth cell group.

30 Claims, 5 Drawing Sheets

(51) Int. Cl.
*H04W 36/12* (2009.01)
*H04W 74/08* (2009.01)
*H04W 74/0833* (2024.01)
*H04W 76/14* (2018.01)
*H04W 84/04* (2009.01)
*H04W 92/04* (2009.01)

(52) U.S. Cl.
CPC ............ *H04W 76/14* (2018.02); *H04B 7/155* (2013.01); *H04W 84/042* (2013.01); *H04W 92/045* (2013.01)

(58) Field of Classification Search
CPC ... H04W 92/045; H04W 84/047; H04B 7/155
USPC ......................................................... 370/331
See application file for complete search history.

(56) References Cited

U.S. PATENT DOCUMENTS

| | | | |
|---|---|---|---|
| 2020/0059957 A1 | 2/2020 | Pan et al. | |
| 2020/0146025 A1* | 5/2020 | Choi | H04W 88/14 |
| 2020/0154287 A1* | 5/2020 | Novlan | H04L 5/0075 |

FOREIGN PATENT DOCUMENTS

| | | | | |
|---|---|---|---|---|
| KR | 20200013593 A1 * | 2/2020 | ............ | H04W 28/10 |
| WO | 2019204966 A1 | 10/2019 | | |
| WO | WO-2019246446 A1 * | 12/2019 | ........ | H04W 36/0055 |
| WO | WO-2020027491 A1 * | 2/2020 | ............ | H04L 1/0007 |
| WO | WO-2020030109 A1 * | 2/2020 | ........ | H04W 36/0011 |
| WO | WO-2020034909 A1 * | 2/2020 | ............ | H04B 7/155 |
| WO | WO-2020051588 A1 * | 3/2020 | ............ | H04W 76/11 |
| WO | WO-2020090987 A1 * | 5/2020 | ............ | H04W 24/04 |
| WO | WO-2020090988 A1 * | 5/2020 | ........ | H04W 36/0061 |

OTHER PUBLICATIONS

Qualcomm (Rapporteur): "CR to 38.300 on Integrated Access and Backhaul for NR", 3GPP Draft, RP-201179, 3GPP TSG-RAN WG2 Meeting #110e, France, vol. RAN WG2, No. E-meeting, Jun. 1, 2020-Jun. 12, 2020, Jun. 25, 2020 (Jun. 25, 2020), R2-2006303, XP051906128, 22 Pages.

* cited by examiner

TECHNIQUES FOR ASSOCIATING INTEGRATED ACCESS AND BACKHAUL (IAB) NODES WITH DIFFERENT UPSTREAM NODES

CLAIM OF PRIORITY UNDER 35 U.S.C. § 119

The present application for patent claims priority to Provisional Patent Application No. 63/045,793, entitled "TECHNIQUES FOR ASSOCIATING INTEGRATED ACCESS AND BACKHAUL (IAB) NODES WITH DIFFERENT UPSTREAM NODES" filed Jun. 29, 2020, which is assigned to the assignee hereof and hereby expressly incorporated by reference herein for all purposes.

BACKGROUND

Aspects of the present disclosure relate generally to wireless communication systems, and more particularly, to integrated access and backhaul (IAB) nodes.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

Integrated access and backhaul (IAB) nodes provide one or more downstream nodes (e.g., user equipment (UE) or other IAB nodes) with access to one or more upstream nodes (e.g., an IAB node or IAB donor node having a wireline connection or other direct connection to a core network). An IAB node can include a mobile termination (MT) function to facilitate communicating with the one or more upstream nodes and a distributed unit (DU) function to facilitate communicating with the one or more downstream nodes. 5G NR technologies, such as millimeter wave (mmWave) can be used to support the access network between IAB nodes and UEs and to support the backhaul network between IAB nodes in the IAB network.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, an apparatus for wireless communication is provided that includes a transceiver, a memory configured to store instructions, and one or more processors communicatively coupled with the memory and the transceiver. The one or more processors are configured to execute the instructions to cause the apparatus to receive, by a mobile termination (MT) function of an integrated access and backhaul (IAB) node, a first indication to migrate from a first IAB donor node associated with a first cell group and a first central unit (CU) to a second IAB donor node associated with a second cell group and a second CU, perform, by the IAB node and based at least in part on receiving the first indication, a first random access procedure to connect to the second cell group associated with the second IAB donor node, establish, by the IAB node in addition to a first distributed unit (DU) function of the IAB node that serves a third cell group and based on performing the first random access procedure, a second DU function that serves a fourth cell group, and trigger, based on establishing the second DU function, a second random access procedure for a child node to migrate from the third cell group associated with the first DU function to the fourth cell group associated with the second DU function.

According to another aspect, a method of wireless communication is provided. The method includes receiving, by a MT function of an IAB node, a first indication to migrate from a first IAB donor node associated with a first cell group and a first CU to a second IAB donor node associated with a second cell group and a second CU, performing, by the IAB node and based at least in part on receiving the first indication, a first random access procedure to connect to the second cell group associated with the second IAB donor node, establishing, by the IAB node in addition to a first DU function of the IAB node that serves a third cell group and based on performing the first random access procedure, a second DU function that serves a fourth cell group, and triggering, based on establishing the second DU function, a second random access procedure for a child node to migrate from the third cell group associated with the first DU function to the fourth cell group associated with the second DU function.

According to another aspect, an apparatus for wireless communication is provided that includes means for receiving, by a MT function of an IAB node, a first indication to migrate from a first IAB donor node associated with a first cell group and a first CU to a second IAB donor node associated with a second cell group and a second CU, means for performing, by the IAB node and based at least in part on receiving the first indication, a first random access procedure to connect to the second cell group associated with the second IAB donor node, means for establishing, by the IAB node in addition to a first DU function of the IAB node that serves a third cell group and based on performing the first random access procedure, a second DU function that serves a fourth cell group, and means for triggering, based on establishing the second DU function, a second random access procedure for a child node to migrate from the third cell group associated with the first DU function to the fourth cell group associated with the second DU function.

According to yet another example, a computer-readable medium including code executable by one or more processors for wireless communications is provided. The code includes code for receiving, by a MT function of an IAB node, a first indication to migrate from a first IAB donor node associated with a first cell group and a first CU to a second IAB donor node associated with a second cell group and a second CU, performing, by the IAB node and based at least in part on receiving the first indication, a first random access procedure to connect to the second cell group associated with the second IAB donor node, establishing, by the IAB node in addition to a first DU function of the IAB node that serves a third cell group and based on performing the first random access procedure, a second DU function that serves a fourth cell group, and triggering, based on establishing the second DU function, a second random access procedure for a child node to migrate from the third cell group associated with the first DU function to the fourth cell group associated with the second DU function.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
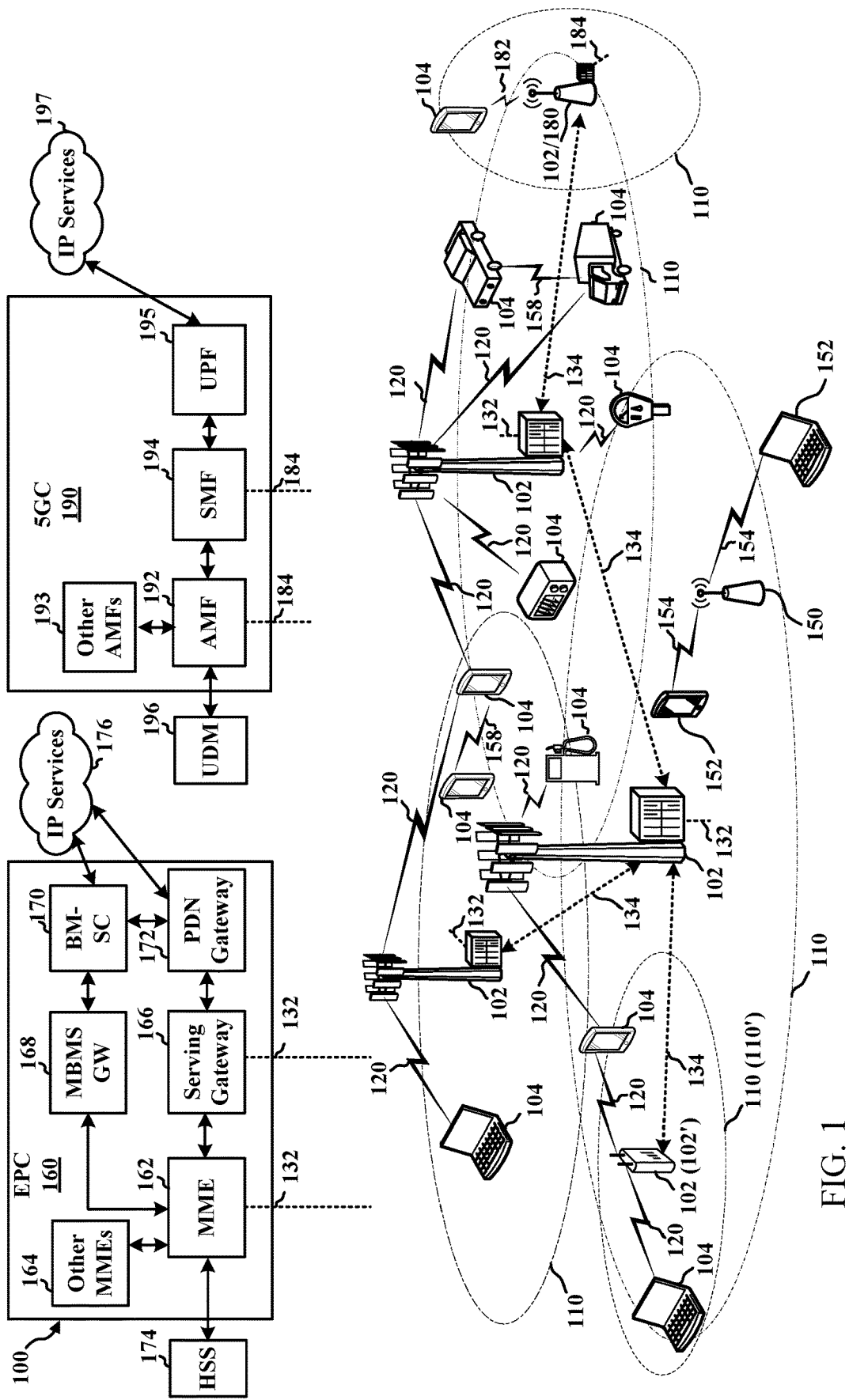
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to associating integrated access and backhaul (TAB) nodes with different upstream IAB nodes (e.g., different IAB donor nodes). In an example, an IAB network can include one or more IAB donor nodes that have a direct connection with a core network, which may include a wireline connection. In certain radio access technologies (RATs), such as fifth generation (5G) new radio (NR), the IAB donor node can terminate a Ng interface with a core network. In this example, the IAB donor node can include a central unit (CU) function that controls the JAB network through configuration, and a distributed unit (DU) function that schedules child nodes (e.g., downstream nodes) of the IAB donor node. In this example, the JAB node can include a mobile termination (MT) function as a scheduled node similar to a UE scheduled by its parent IAB node or IAB donor node, and a DU as a scheduling node that schedules child nodes of the IAB node.

The IAB network may also include one or more UEs connected to one or more of the IAB nodes. The IAB network can include an access network between the IAB nodes and UEs and a backhaul network between IAB nodes, one or more of which can be based on 5G NR technologies, such as millimeter wave (mmWave). In an IAB node, RAT resources (e.g., a collection of time and/or frequency resources) can be shared between the access and backhaul networks (e.g., between communications over the access and backhaul networks). In addition, for example, a DU function of an IAB node can have an assigned identifier, such as a NR cell global identity (NR-CGI). For example, a NR-CGI can include a public land mobile identifier (PLMN ID) and a NR cell identifier (NCI). The NCI can include a gNB identifier (e.g., an identifier associated with or otherwise defined for a gNB, where the gNB may be the IAB donor node) and a local cell identifier. Based on being generated from this combination of identifiers, for example, the NR-CGI may be unique for each DU function within the IAB network. The DU function of the IAB node can also have a physical cell identifier (PCI), which may be limited to a certain number of values and may not be unique.

Aspects described herein relate to associating an IAB node with different IAB donor nodes, which may include modifying the IAB node that may be communicating with a first upstream IAB donor node to instead communicate with a second upstream IAB donor node. Modifying the IAB node in this regard may also at least include updating an identifier (e.g., NR-CGI) associated with the IAB node. For example, the IAB node may switch from one IAB donor node to another IAB donor node during times of high interference, high load on the IAB node, etc., and/or where the IAB node is mobile and can select different IAB donor nodes as it moves throughout a coverage area of the IAB network. In these examples, the MT function of the IAB node can select different IAB donor nodes, which may be caused by selecting different upstream IAB nodes that are connected to different IAB donor nodes. In an example, based on selecting a different IAB donor node, which has a different gNB identifier than a previous IAB donor node, the IAB node can establish a different DU function associated with the different gNB identifier, where the different DU function may accordingly have a different NR-CGI than the previous DU function. In addition, the IAB node can trigger one or more child nodes to associate with, or migrate to, the different DU function to provide network access to the one or more child nodes via the different IAB donor node. This can allow the IAB node to communicate with different IAB donor nodes, and to handle the transfer of child nodes without causing radio link failure or other interruption in communication to the child nodes. This, in turn, can improve network connectivity, efficiency, and user experience for the child nodes.

The described features will be presented in more detail below with reference to FIGS. 1-5.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers.

The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet-switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

As described in examples herein, wireless communication access network 100 can provide a framework for an IAB network. In an example, the IAB can include an access network between IAB nodes and UEs, and a backhaul network between IAB nodes. The IAB network can generally include anchor nodes including IAB nodes with a wireline or other connection to a network (e.g., to an EPC), which are referred to as IAB donor nodes, and one or more IAB nodes that can relay traffic from/to the anchor nodes via one or more hops among IAB nodes, and can be or can be referred to as a layer 2 relay node. An IAB network may use a similar framework as the wireless communication access network 100, where a base station 102 may be an anchor node to the EPC (and/or may be an IAB donor node, can provide a connection for an IAB donor node, or can be similar to a DU function of an IAB node), and a UE 104 may be a UE or a MT function of a IAB node to relay traffic from the anchor node to other UEs. In this example, a UE 104 that functions as a IAB node can include 1) a DU function for communicating with one or more UEs or downstream IAB nodes (e.g., by transmitting over a downlink and receiving over an uplink), and 2) a MT function for communicating with an IAB donor node and/or one or more upstream IAB nodes (e.g., by transmitting over an uplink and receiving over a downlink). As described, an IAB network can share radio resources (e.g., time and/or frequency resources) between the access and backhaul networks, and may operate using a 5G NR RAT. One specific example of an IAB network is shown in FIG. 2.

Figure 2:
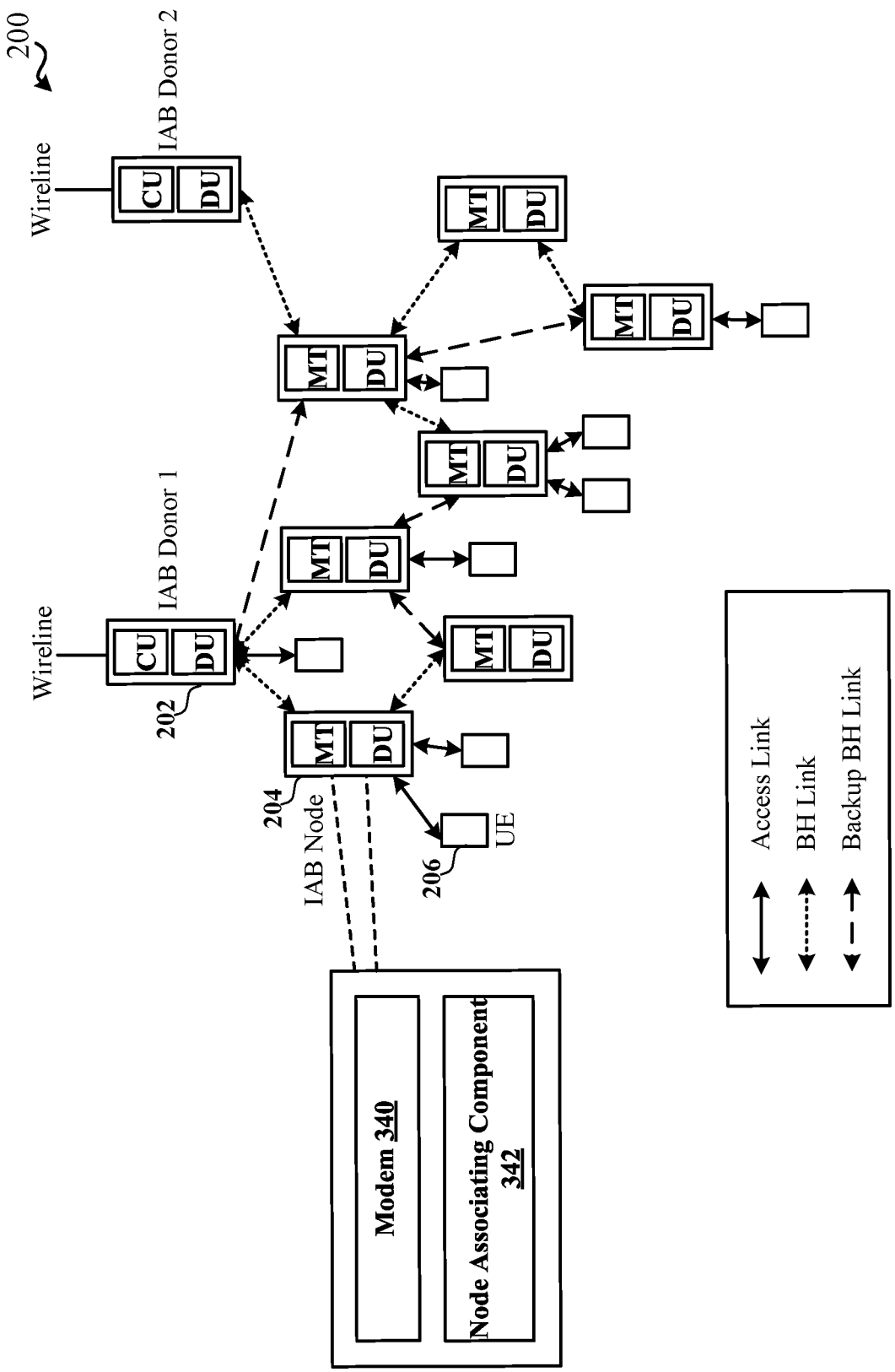
FIG. 2 illustrates an example of a wireless communication system that provides an integrated access and backhaul (IAB) network, in accordance with various aspects of the present disclosure.

Referring to FIG. 2, in accordance with various aspects described herein, an example of another wireless communication access network 200 that can provide JAB functionality is depicted. The wireless communication access network 200 can include one or more IAB donor nodes 202, one or more IAB nodes 204 that can communicate with the IAB donor nodes 202 and/or other IAB nodes 204 to facilitate communication between one or more UEs 206 and the IAB donor nodes 202. Generally, as used herein, a downstream node can refer to a node that is downstream, e.g., closer to a UE, from a connected upstream node. For example, IAB node 204 is a downstream node of IAB Donor 1 202. Similarly, as used herein, an upstream node can refer to a node that is upstream, e.g., closer to a network, from a connected downstream node. For example, JAB Donor 1 202 is an upstream node of IAB Node 204. In addition, a node can generally transmit over a downlink to its downstream node(s), and/or can generally receive over an uplink from its downstream node(s).

In an example, the IAB donor nodes 202 can include a wireline connection to a network (e.g., to one or more backend network components, such as one or more components in EPC 160, as described in FIG. 1). In one example, the IAB donor nodes 202 can be, or can provide similar functionality as, base stations 102. The IAB donor nodes 202 may provide a CU function, which can hold radio resource control (RRC) layer, packet data convergence protocol (PDCP) layer, and/or similar layer functions, and a DU function, which can hold radio link control (RLC) layer, media access control (MAC) layer, physical (PHY) layer, and/or similar layer functions. The IAB nodes 204 can provide DU and MT functions, as described. In this regard, the IAB nodes 204 can communicate with the IAB donor node 202 or other upstream IAB nodes using the MT function, which is controlled and scheduled by the IAB donor node 202 or the other upstream IAB nodes 204 connected as parent nodes (e.g., by the DU), and can use a backhaul link. For example, connection and/or communication between an IAB node 204 and an IAB donor node 202 (and/or between an IAB node 204 and another upstream IAB node 204) can be similar to that described respectively between UE 104 and base station 102 in FIG. 1. In addition, for example, the IAB nodes 204 can also communicate with one or more UEs 206 or other downstream IAB nodes 204 using the DU function, which can provide similar functions as base station 102 including scheduling communications for the UEs 206 and/or other downstream IAB nodes 204 connected as child nodes, and controlling both access links and backhaul links under its coverage. In an example, an IAB node 204 can provide the DU function to communicate with a UE 206 and can provide access to a CU function of a IAB donor node 202 via zero or more hops to other IAB nodes 204 using the MT function.

Moreover, IAB donor nodes 202 or IAB nodes 204 can provide (e.g., via the DU function) one or more cells for communicating with the downstream nodes. Each of the one or more cells can have a cell identifier, which can include a NR-CGI that can uniquely identify the cell in the IAB network. For example, a NR-CGI may include, or be generated by or to include, a PLMN ID (which can be 24 bits) and a NCI (which can be 36 bits in 5G NR), where the PLMN ID can be formed of a mobile country code (MCC, which can be 12 bits) and a mobile network code (MNC, which can be 12 bits), and the NCI can be formed of a gNB identifier (e.g., the left most 22 to 32 bits) and a local cell identifier (e.g., the remaining bits of the total 36 bits in 5G NR). The gNB-ID can be unique within a gNB and thus can be common for all cells (e.g., at IAB donor DUs and IAB node DUs) served by the gNB (with one IAB donor CU). Similarly, the PLMN+gNB-ID can globally identify a gNB. In addition, each cell can have a physical cell identifier (PCI), which can be defined in 5G NR as one of a total 1008 supported values. Thus, for example, a PCI can be reused by multiple geographic separated cells in a network. Cells with same PCI can be distinguished by their unique cell global identifiers (e.g., NR-cell global identifier (NCGI) in 5G, cell global identifier (CGI) in LTE, etc.). Cells can broadcast PCI by primary synchronization signal (PSS)/secondary synchronization signal (SSS) in a synchronization signal block (SSB) as defined in 5G NR, and PCI can be used to determine scrambling sequence of many physical signal/ channels. For example, for primary broadcast channel (PBCH), physical downlink control channel (PDCCH), control resource set (CORESET) 0, or cell-specific physical downlink shared channel (PDSCH) transmission transmitted by the cell, as defined in 5G NR, only PCI can be used as scrambling seed; while for other channels, configured scrambling seed can also be supported beside PCI. In an example, an IAB node 204 can include a modem 340 and/or node associating component 342 for associating with different donor nodes, in accordance with aspects described herein.

Figure 3:
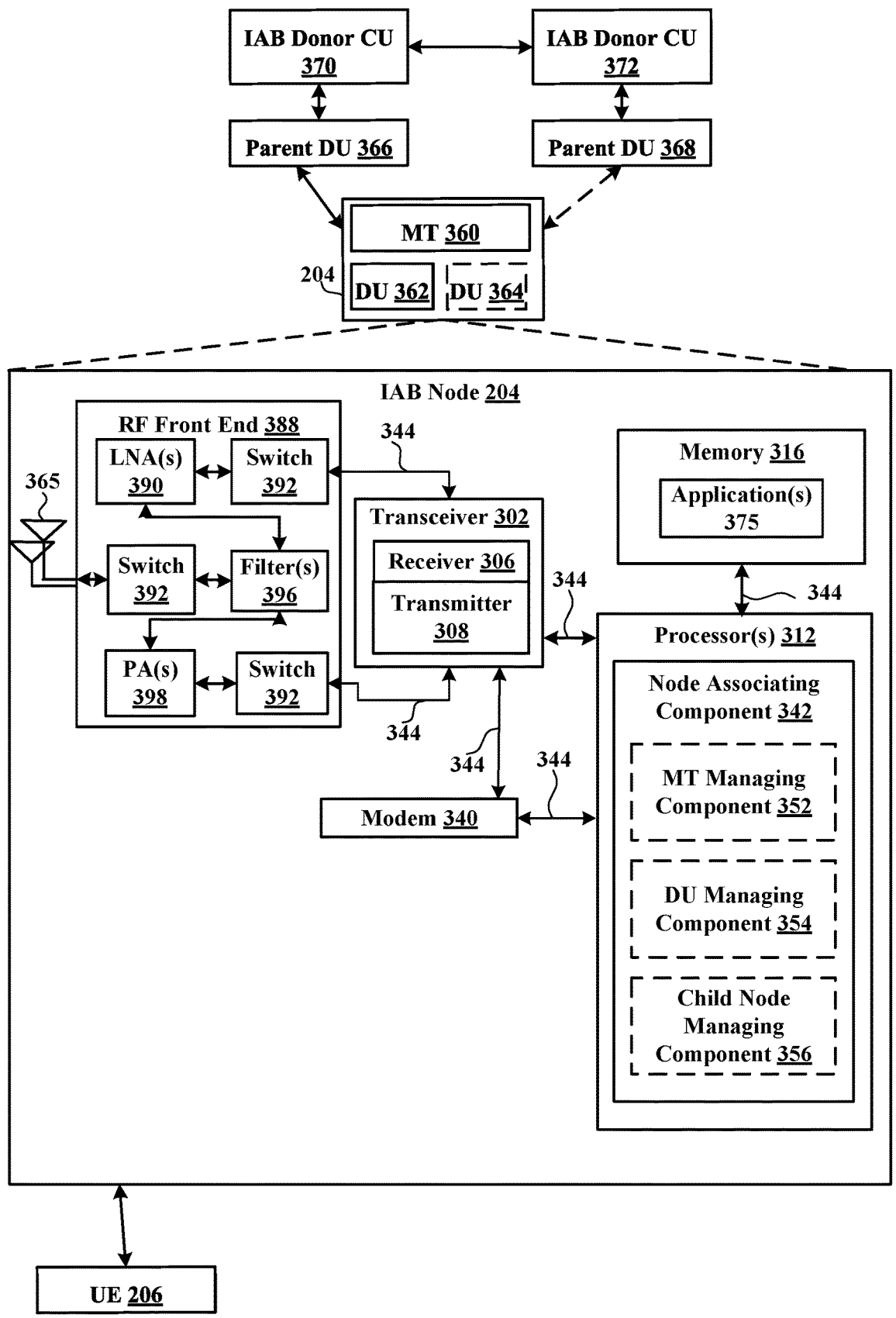
FIG. 3 is a block diagram illustrating an example of an IAB node, in accordance with various aspects of the present disclosure.
Figure 4:
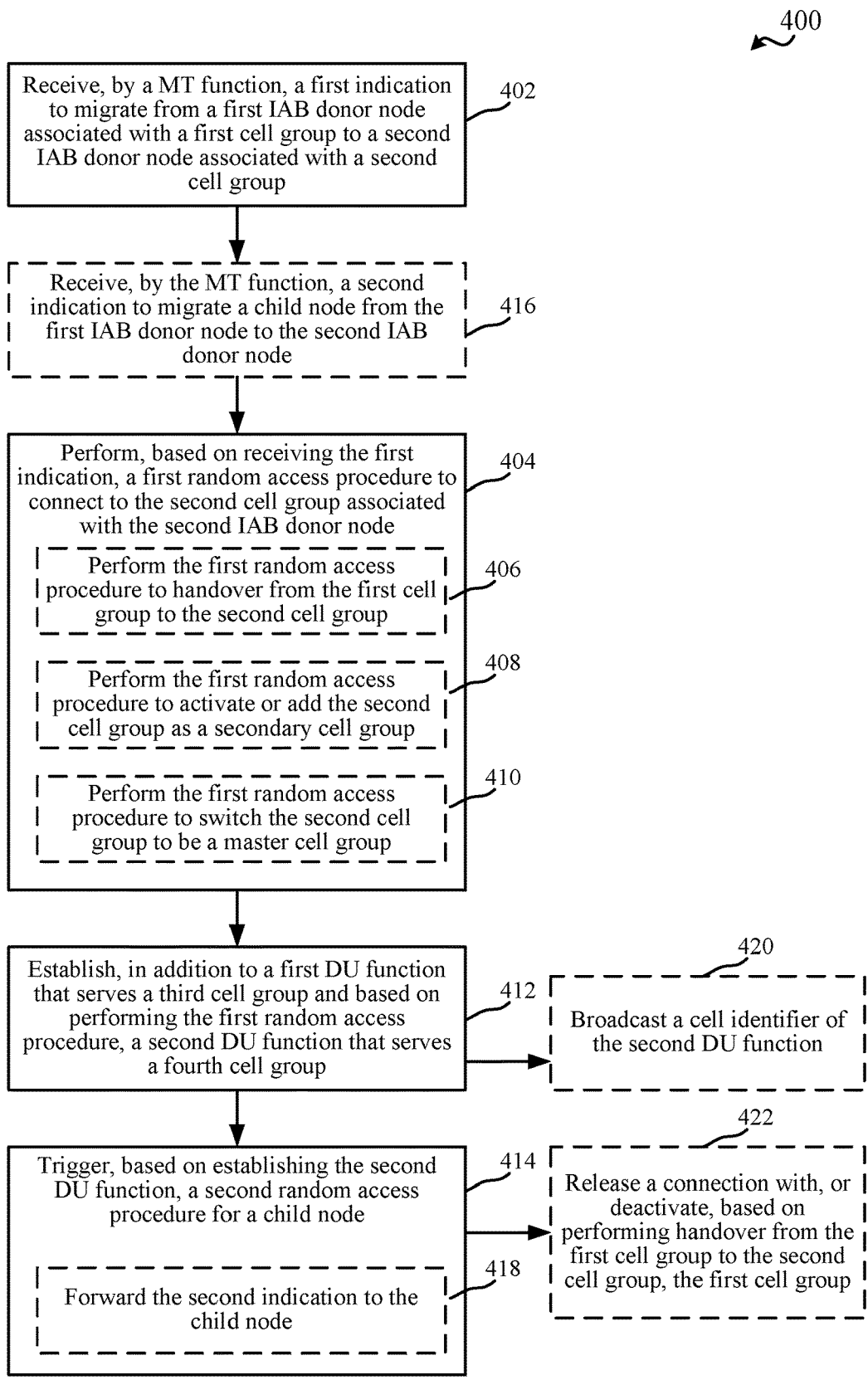
FIG. 4 is a flow chart illustrating an example of a method for associating with different IAB donor nodes, in accordance with various aspects of the present disclosure.
Figure 5:
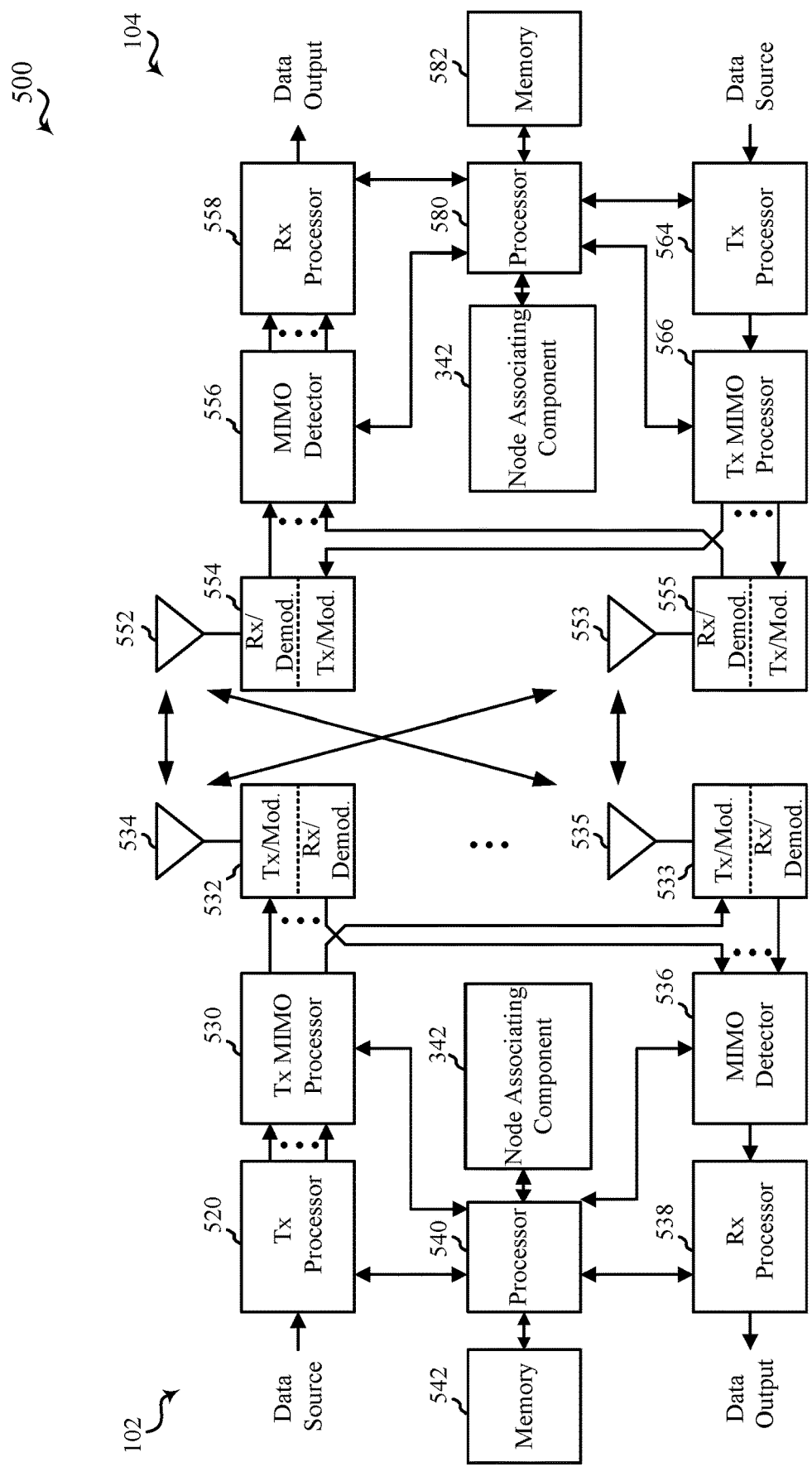
FIG. 5 is a block diagram illustrating an example of a MIMO communication system including a base station and a UE, in accordance with various aspects of the present disclosure.

Turning now to FIGS. 3-5, aspects are depicted with reference to one or more components and one or more methods that may perform the actions or operations described herein, where aspects in dashed line may be optional. Although the operations described below in FIG. 4 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 3, one example of an implementation of a IAB node 204 may include a variety of components, some of which have already been described above and are described further herein, including components such as one or more processors 312 and memory 316 and transceiver 302 in communication via one or more buses 344, which may operate in conjunction with modem 340 and/or node associating component 342 to enable one or more of the functions described herein related to associating with different donor nodes.

In an aspect, the one or more processors 312 can include a modem 340 and/or can be part of the modem 340 that uses one or more modem processors. Thus, the various functions related to node associating component 342 may be included in modem 340 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 340 associated with node associating component 342 may be performed by transceiver 302.

Also, memory 316 may be configured to store data used herein and/or local versions of applications 375 or node associating component 342 and/or one or more of its subcomponents being executed by at least one processor 312. Memory 316 can include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining node associating component 342 and/or one or more of its subcomponents, and/or data associated therewith, when IAB node 204 is operating at least one processor 312 to execute node associating component 342 and/or one or more of its subcomponents.

Transceiver 302 may include at least one receiver 306 and at least one transmitter 308. Receiver 306 may include hardware, firmware, and/or software code executable by a processor for receiving data, the code comprising instructions and being stored in a memory (e.g., computer-readable medium). Receiver 306 may be, for example, a radio frequency (RF) receiver. In an aspect, receiver 306 may receive signals transmitted by an upstream node, a downstream node, etc. Additionally, receiver 306 may process such received signals, and also may obtain measurements of the signals, such as, but not limited to, Ec/Io, SNR, RSRP, RSSI, etc. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, IAB node 204 may include RF front end 388, which may operate in communication with one or more antennas 365 and transceiver 302 for receiving and transmitting radio transmissions, for example, wireless communications transmitted by at least one base station 102 or wireless transmissions transmitted by IAB node 204. RF front end 388 may be connected to one or more antennas 365 and can include one or more low-noise amplifiers (LNAs) 390, one or more switches 392, one or more power amplifiers (PAs) 398, and one or more filters 396 for transmitting and receiving RF signals.

In an aspect, LNA 390 can amplify a received signal at a desired output level. In an aspect, each LNA 390 may have a specified minimum and maximum gain values. In an aspect, RF front end 388 may use one or more switches 392 to select a particular LNA 390 and its specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and its specified gain value based on a desired gain value for a particular application.

Also, for example, one or more filters 396 can be used by RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, RF front end 388 can use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver 302 may be tuned to operate at specified frequencies such that IAB node 204 can communicate with, for example, one or more upstream nodes or one or more cells associated with one or more upstream nodes, one or more DUs, etc. In an aspect, for example, modem 340 can configure transceiver 302 to operate at a specified frequency and power level based on a configuration of the IAB node 204 and the communication protocol used by modem 340.

In an aspect, modem 340 can be a multiband-multimode modem, which can process digital data and communicate with transceiver 302 such that the digital data is sent and received using transceiver 302. In an aspect, modem 340 can be multiband and be configured to support multiple frequency bands for a specific communications protocol. In an aspect, modem 340 can be multimode and be configured to support multiple operating networks and communications protocols. In an aspect, modem 340 can control one or more components of IAB node 204 (e.g., RF front end 388, transceiver 302) to enable transmission and/or reception of signals from the network based on a specified modem configuration. In an aspect, the modem configuration can be based on the mode of the modem and the frequency band in use. In another aspect, the modem configuration can be based on configuration information associated with IAB node 204 as provided by the network during cell selection and/or cell reselection or initial access.

In an aspect, the processor(s) 312 may correspond to one or more of the processors described in connection with the base station and/or UE in FIG. 5 to provide a MT function 360 or DU function 362/364, as described. Similarly, the memory 316 may correspond to the memory described in connection with the base station and/or UE in FIG. 5 to provide the MT function 360 or DU function 362/364, as described. Moreover, for example, the transceiver 302 can include various transmit and/or receive hardware described in connection with the base station and/or UE in FIG. 5, such as a transmit or receive processor, a transmit or receive MIMO processor or detector, etc. In addition, for example, modem 340 can include a transmit or receive modulator or demodulator described in connection with the base station and/or UE in FIG. 5. Also, in an example, antennas 365 can include transmit or receive antennas described in connection with the base station and/or UE in FIG. 5.

In addition, for example, node associating component 342 may include a MT managing component 352 for managing one or more MT functions (e.g., MT function 360) of the IAB node 204 to communicate with one or more parent DUs (e.g., parent DUs 366 and/or 368, which may be part of upstream IAB nodes and/or IAB donor nodes), DU managing component 354 for managing one or more DU functions of the IAB node (e.g., DU function 362 and/or 364), and/or a child node managing component 356 for managing one or more child nodes or downstream nodes of the IAB node 204 (e.g., another IAB node, UE 206, etc.). In an example, IAB node 204 can communicate with a parent DU 366 via MT function 360, where the parent DU 366 can communicate with an IAB donor CU 370 through zero or more additional IAB nodes. In another example, IAB node 204 can additionally or alternatively communicate with a parent DU 368 via MT function 360, where the parent DU 368 can communicate with an IAB donor CU 372 that is different from IAB donor CU 370. Moreover, in an example as described further herein, IAB node 204 can provide DU function 362 to facilitate access of one or more downstream nodes to IAB donor CU 370 and/or can provide DU function 364 to facilitate access of one or more downstream nodes to IAB donor CU 372.

As described, for example, the IAB donor CUs 370, 372 can be part of different IAB donor nodes, where the different IAB donor nodes can be associated with different cell groups. For example, each IAB donor node (or CUs 370, 372) can provide a cell group via a base station (or DU) associated with the IAB donor node.

FIG. 4 illustrates a flow chart of an example of a method 400 for associating a IAB node with different IAB donor nodes, in accordance with aspects described herein. In an example, an IAB node 204 can perform the functions described in method 400 using one or more of the components described in FIGS. 2 and 3.

In method 400, at Block 402, a first indication to migrate from a first IAB donor node associated with a first cell group to a second IAB donor node associated with a second cell group can be received by an MT function. In an aspect, MT managing component 352, e.g., in conjunction with processor(s) 312, memory 316, transceiver 302, mode associating component 342, etc., can receive, by the MT function 360, the first indication to migrate from a first IAB donor node (or associated IAB donor CU) associated with a first cell group to a second IAB donor node (or associated IAB donor CU) associated with a second cell group. For example, the MT function 360 may receive the first indication from the IAB donor node via parent (or upstream) DU 366 (e.g., via RRC signaling). For example, the parent DU function 366 can receive the first indication from the IAB donor node (e.g., via F1-C signaling), etc.

In one example, the first indication may indicate to handover from the first IAB donor node associated with the IAB donor CU 370 to the second IAB donor node associated with the IAB donor CU 372. In another example, the first indication may indicate to add the cell group served by the parent DU 368 and/or the second IAB donor node associated with the IAB donor CU 372 as a secondary cell group (e.g., in multiple connectivity or dual connectivity). In this example, the first cell group served by the parent DU 366 and/or the first IAB donor node associated with IAB donor CU 372 can be a master cell group.

In another example, the first indication may indicate to add the cell group served by the parent DU 368 and/or the second IAB donor node associated with the IAB donor CU 372 as a secondary cell group (e.g., in multiple connectivity or dual connectivity). In this example, the first cell group served by the parent DU 366 and/or the first IAB donor node associated with IAB donor CU 372 is also a secondary cell group. In addition, in this example, the first indication may indicate to release the first cell group served by the parent DU 366 and/or the first IAB donor node associated with the IAB donor CU 370 as the secondary cell group.

In yet another example, the first indication may indicate to switch the cell group served by the parent DU 368 and/or by the second IAB donor node associated with the IAB donor CU 372 to the master cell group and the first cell group served by the parent DU 366 and/or by the first IAB donor node associated with the IAB donor CU 370 to the secondary cell group.

In method 400, at Block 404, based on receiving the first indication, a first random access procedure can be performed to connect to a second cell group associated with the second IAB donor node. In an aspect, MT managing component 352, e.g., in conjunction with processor(s) 312, memory 316, transceiver 302, mode associating component 342, etc., can perform, based on receiving the first indication, the first random access procedure to connect with the second cell group associated with the second IAB donor node. For example, MT managing component 352 can perform the first random access procedure with the second cell group and/or second IAB donor node (associated with IAB donor CU 372), based on the first indication received from the parent DU 366 or first IAB donor node (associated with IAB donor CU 370). In one example, performing the random access procedure with the second cell group and/or second IAB donor node can be similar to conventional handover to the second cell group, or to adding the second cell group as a secondary cell group, switching the second cell group to a master cell group, etc., as described, which may be based on the first indication, specified by the first indication, and/or the like.

For example, in performing the first random access procedure at Block 404, optionally at Block 406, the first random access procedure can be performed to handover from the first cell group to the second cell group. In an aspect, MT managing component 352, e.g., in conjunction with processor(s) 312, memory 316, transceiver 302, mode associating component 342, etc., can perform the first random access procedure to handover from the first cell group to the second cell group. For example, MT managing component 352 can perform a four-step random access procedure or a two-step random access procedure, either of which can be contention-based on contention-free. In addition, MT managing component 352 can perform the random access procedure as part of handover, adding a cell group as a secondary cell group, switching a secondary cell group to a master cell group, etc.

For example, conventional handover may include a source gNB initiating handover and issuing a HANDOVER REQUEST to a target gNB over the Xn interface, where the target gNB can perform admission control and provide a new RRC configuration to the source gNB as part of the HANDOVER REQUEST ACKNOWLEDGE. The source gNB can provide the RRC configuration to the UE by forwarding the RRCReconfiguration message received in the HANDOVER REQUEST ACKNOWLEDGE. In this example, the UE can move the RRC connection to the target gNB (e.g., by performing a random access procedure therewith) and can reply with the RRCReconfigurationComplete. The target gNB can send the UE CONTEXT RELEASE to inform the source gNB about the success of the handover. In a specific example, MT managing component 352 can perform the random access procedure (e.g., at Block 404) as part of a handover procedure similar to conventional handover. For example, the first cell group or first IAB donor node (associated with IAB donor CU 370) can perform functions similar to the source gNB described above, the second cell group or second IAB donor node (associated with IAB donor CU 372) can perform functions similar to the target gNB described above, and/or the IAB node 204 (e.g., via MT function 360) can perform functions similar to the UE described above, performing the random access procedure as part of handover.

In another example, in performing the first random access procedure at Block 404, optionally at Block 408, the first random access procedure can be performed to activate or add the second cell group as a secondary cell group. In an aspect, MT managing component 352, e.g., in conjunction with processor(s) 312, memory 316, transceiver 302, mode associating component 342, etc., can perform the first random access procedure to activate or add the second cell group as a secondary cell group. In one example, MT managing component 352 can communicate with the first cell group as a master cell group and can perform the random access procedure to add the second cell group as a secondary cell group in multiple connectivity (or dual connectivity). In another example, MT managing component 352 can communicate with the first cell group as a secondary cell group in multiple connectivity (or dual connectivity) and can perform the random access procedure to add the second cell group as an additional secondary cell group and/or to activate the second cell group as the secondary cell group instead of the first cell group (e.g., and/or can release the first cell group as the secondary cell group).

In another example, in performing the first random access procedure at Block 404, optionally at Block 410, the first random access procedure can be performed to switch the second cell group to be a master cell group. In an aspect, MT managing component 352, e.g., in conjunction with processor(s) 312, memory 316, transceiver 302, mode associating component 342, etc., can perform the first random access procedure to switch the second cell group to be the master cell group (e.g., in multiple connectivity or dual connectivity). In this example, MT managing component 352 can also switch the first cell group to be the secondary cell group.

In method 400, at Block 412, in addition to a first DU function that serves a third cell group, a second DU function that serves a fourth cell group can be established based on performing the first random access procedure. In an aspect, DU managing component 354, e.g., in conjunction with processor(s) 312, memory 316, transceiver 302, mode associating component 342, etc., can establish, in addition to the first DU function (e.g., DU function 362) that serves a third cell group and based on the MT function 360 performing the first random access procedure, the second DU function (e.g., DU function 364) that serves the fourth cell group. DU managing component 354 can establish the second DU function 364 as served by the second cell group and/or second IAB donor node (associated with IAB donor CU 372). DU managing component 354 can establish the second DU function 364 as parameters of the DU function may change based on being associated with or served by the second cell group and/or second IAB donor node (associated with IAB donor CU 372). For example, the second cell group may have or be associated with a different identifier (e.g., gNB identifier) than the first cell group, and thus the second DU function 364 may be established to advertise a different DU identifier associated with the second cell group (e.g., a different NCGI that includes the different gNB identifier). In another example, the second DU function 364 can also be established with a different PCI than the first DU function 362 to differentiate signaling from the DU functions 362, 364 (e.g., to avoid PCI collision in mobile IAB node scenario). In any case, establishing the second DU function can allow one or more child nodes to establish a connection with the second DU function, whether a new connection or a connection moved from the first DU function, etc.

As described, the DU function can include a backhaul connection of the IAB node that serves the DU function to the IAB donor CU and the air broadcast or access network connection to downstream nodes. In one example, DU managing component 354 can instantiate multiple DU functions, as described herein, by having the IAB node have multiple F1 connections with different CUs (e.g., one F1 connection with IAB donor CU 370 and a different F1 connection with IAB donor CU 372), where each DU function can be associated with one of the F1 connections. In this example, DU managing component 354 may or may not broadcast cell identifiers for each DU function. In one example, based on establishing the second DU function 364, IAB node 204 may remove the first DU function 362 (e.g., in the case of handover). This may include DU managing component 354 only broadcasting the cell identifier for the cell or cell group of the second DU function 364. In another example, IAB node 204 may keep the first DU function 362 and the second DU function 364 (e.g., in the case or examples of multiple connectivity described above) at least for a period of time. This may include DU managing component 354 broadcasting cell identifiers for both the cells (or cell groups) of the first DU function 362 and the second DU function 364. In one example, IAB node 204 may keep the first DU function 362 until all child nodes have been moved (e.g., handed over to) the second DU function 364.

In method 400, at Block 414, based on establishing the second DU function, a second random access procedure can be triggered for a child node. In an aspect, child node managing component 356, e.g., in conjunction with processor(s) 312, memory 316, transceiver 302, mode associating component 342, etc., can trigger, based on establishing the second DU function, the second random access procedure for the child node. For example, the child node may include a UE 206, one or more downstream IAB nodes, etc. In an example, child node managing component 356 can trigger the second random access procedure for the child node to cause the child node to establish a connection with the second DU function 364. As described above with respect to the first random access procedure, the second random access procedure triggered for the child node can similarly be part of handover from the third cell group associated with the first DU function 362 to the fourth cell group associated with the second DU function 364, part of activating or adding the fourth cell group associated second DU function 364 as a secondary cell group, part of switching the fourth cell group associated second DU function 364 to be a master cell group (and/or switching the third cell group associated first DU function 362 to be the secondary cell group), etc. In one example, in triggering the second random access procedure, child node managing component 356 may indicate an identifier of the second DU function 364 (e.g., NCGI, PCI, etc.) to the child node, which the child node can use in performing the second random access procedure (e.g., to identify the second DU function 364).

In method 400, optionally at Block 416, a second indication to migrate the child node from the first IAB donor node to the second IAB donor node can additionally be received by the MT function. In an aspect, MT managing component 352, e.g., in conjunction with processor(s) 312, memory 316, transceiver 302, mode associating component 342, etc., can receive, by the MT function 360, the second indication to migrate the child node (e.g., one or more UEs 206 or downstream IAB nodes) from a first IAB donor node (or associated IAB donor CU) associated with the first cell group to a second IAB donor node (or associated IAB donor CU) associated with the second cell group. For example, MT managing component 352 may receive the second indication from the first IAB donor node (or associated IAB donor CU), the second IAB donor node (or associated IAB donor CU), and/or the like. In an example, MT managing component 352 can perform the first random access procedure based additionally on receiving the second indication, DU managing component 354 can establish the second DU function based additionally on receiving the second indication, etc.

In addition, for example, triggering the second random access procedure for the child node at Block 414 can optionally include, at Block 418, forwarding the second indication to the child node. In an aspect, DU managing component 354, e.g., in conjunction with processor(s) 312, memory 316, transceiver 302, mode associating component 342, etc., can forward the second indication to the child node. For example, DU managing component 354 can transmit the second indication to the child node in RRC signaling. The first indication and/or the second indication can be a conditional indication indicating one or more conditions for determining to establish the second DU and/or migrate the UE to the second DU, etc.

In method 400, optionally at Block 420, a cell identifier of the second DU function can be broadcast. In an aspect, DU managing component 354, e.g., in conjunction with processor(s) 312, memory 316, transceiver 302, mode associating component 342, etc., can broadcast the cell identifier of the second DU function. For example, DU managing component 354 can broadcast the NCGI and/or PCI of the second DU function 364 and/or of the first DU function 362. For example, DU managing component 354 can broadcast the NCGI and/or PCI in broadcast signaling, over a broadcast channel, in system information, etc. in the first cell or the second cell. This can allow the child node (e.g., UE 206) to recognize the second DU function 364 for migrating thereto. For example, DU managing component 354 can use the PCI in transmitting PSS/SSS in a SSB, for scrambling PBCH, PDCCH, CORESET 0, cell-specific PDSCH transmission, etc., and/or the like.

In method 400, optionally at Block 422, a connection with the first cell group can be released, or the first cell group can be deactivated, based on performing handover from the first cell group to the second cell group. In an aspect, DU managing component 354, e.g., in conjunction with processor(s) 312, memory 316, transceiver 302, mode associating component 342, etc., can release a connection with, or deactivate, based on performing handover from the first cell group to the second cell group, the first cell group.

According to the examples described herein, an IAB node can have a first signaling connection to a first donor CU and can be served by a first cell group including a first cell and associated with the first IAB donor. A first child node of the IAB node can be served by a second cell group at the IAB node DU including a second cell and associated with the first IAB donor. The IAB node can receive a first message for the JAB node MT and a second message for the first child node to migrate to a second JAB donor. The IAB node can perform a first random access procedure and connect to a third cell group including a third cell and associated with the second IAB donor based on the first message. The IAB node can switch a first function of the IAB node DU upon the successful completion of the first random access procedure, based on which the IAB node DU can serve a fourth cell group comprising a fourth cell and associated with the second JAB donor. The IAB node can trigger or complete a second random access procedure for the first child node based on the second reconfiguration message, upon which the first child node can be served by at least the fourth cell of the fourth cell group.

In addition, in an example, the first signaling connection can be F1-C or RRC. The first child node can be a second IAB node comprising an MT or a UE. The first message or the second message can be an RRC reconfiguration message or RRC connection reconfiguration message. The first cell group and the third cell group may be source and target cell groups respectively, where the IAB node MT can perform a handover from a source gNB including the first IAB donor to a target gNB including the second IAB donor based on the first message and/or can release the first cell group. The first cell group and the third cell group may be source and target secondary cell groups respectively, where the IAB node MT can perform a secondary node change from a source secondary node (SN)-gNB including the first IAB donor to a target SN-gNB including the second IAB donor based on the first message, which may be received from the MN, and/or can release the first cell group. The first cell group may be a master cell group and the third cell group may be a secondary cell group, where the IAB node MT can perform a secondary node addition of a SN-gNB including the second IAB donor based on the first message, in which case the first gNB including the first IAB donor can be a master node (MN)-gNB and the IAB node MT may not release at least the first cell of the first cell group upon adding the third cell group. The IAB node MT may perform a MN/SN switch, where the third cell group and the first cell group can become the master cell group and the secondary cell group respectively (and where the third gNB and the first gNB can become the MN-gNB and the SN-gNB respectively).

In addition, for example, the first cell group and the third cell group may be first and second secondary cell groups respectively, where the IAB node MT can perform a secondary node addition of a second SN-gNB including the second IAB donor based on the first message, in which case the first gNB including the first IAB donor can be a first SN-gNB and the IAB node MT may not release at least the first cell of the first cell group upon adding the third cell group. The first cell group and the third cell group may be a first and second secondary cell groups respectively, where the IAB node MT may activate at least the third cell of the third cell group based on the first message, which may be received from the MN. The first node may set at least the state of the first cell of the first cell group to deactivated or dormant. The IAB node may include at least two MTs and the first message may be for a first MT of the IAB node. The first message may carry conditional configuration (e.g. conditional handover command, conditional SN change, . . . ), where the condition may be defined on at least one of the third cell of the third cell group or the first cell of the first cell group. Switching the first function may include broadcasting a new PCI of the fourth cell, where the second cell holds the old PCI. Switching the first function may including broadcasting a new NCGI or NCI or gNB-ID of the fourth cell, where the second cell holds the old NCGI or NCI or gNB-ID. The IAB node DU may continue broadcasting an identifier of the second cell after switching the first function. The IAB node may include two logical DUs, as described above. Switching the first function may be triggered by a MN/SN switch of the IAB node MT.

In addition, for example, the second cell group and the fourth cell group may be source and target cell groups respectively, where the child node can perform a handover from a source gNB including the first IAB donor to a target gNB including the second IAB donor based on the second message and/or can release the second cell group. The second cell group and the fourth cell group may be source and target secondary cell groups respectively, where the child node can perform a secondary node change from a source SN-gNB including the first IAB donor to a target SN-gNB including the second IAB donor based on the second message and/or can release the second cell group. The child node can receive the second message from a MN-gNB. The second message may carry conditional configuration (e.g. conditional handover command, conditional SN change), where the condition may be defined on at least one of the fourth cell of the fourth cell group or the second cell of the second cell group. The child node can be a second IAB node and may switch a second function of the node DU upon the successful completion of the second random access procedure.

FIG. 5 is a block diagram of a MIMO communication system 500 including a base station 102 (or DU function of an upstream node that is upstream to an IAB node 204) and a UE 104 (or a MT function of the IAB node 204). The MIMO communication system 500 may illustrate aspects of the wireless communication access network 100 described with reference to FIG. 1. The base station 102 may be an example of aspects of the base station 102 described with reference to FIG. 1. The base station 102 may be equipped with antennas 534 and 535, and the UE 104 may be equipped with antennas 552 and 553. In the MIMO communication system 500, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 520 may receive data from a data source. The transmit processor 520 may process the data. The transmit processor 520 may also generate control symbols or reference symbols. A transmit MIMO processor 530 may perform spatial processing (e.g., precoding) on data symbols, control symbols, or reference symbols, if applicable, and may provide output symbol streams to the transmit modulator/demodulators 532 and 533. Each modulator/demodulator 532 through 533 may process a respective output symbol stream (e.g., for OFDM, etc.) to obtain an output sample stream. Each modulator/demodulator 532 through 533 may further process (e.g., convert to analog, amplify, filter, and upconvert) the output sample stream to obtain a DL signal. In one example, DL signals from modulator/demodulators 532 and 533 may be transmitted via the antennas 534 and 535, respectively.

The UE 104 may be an example of aspects of the UEs 104 described with reference to FIGS. 1-2, a MT function of an IAB node 204, etc. At the UE 104, the UE antennas 552 and 553 may receive the DL signals from the base station 102 and may provide the received signals to the modulator/demodulators 554 and 555, respectively. Each modulator/demodulator 554 through 555 may condition (e.g., filter, amplify, downconvert, and digitize) a respective received signal to obtain input samples. Each modulator/demodulator 554 through 555 may further process the input samples (e.g., for OFDM, etc.) to obtain received symbols. A MIMO detector 556 may obtain received symbols from the modulator/demodulators 554 and 555, perform MIMO detection on the received symbols, if applicable, and provide detected symbols. A receive (Rx) processor 558 may process (e.g., demodulate, deinterleave, and decode) the detected symbols, providing decoded data for the UE 104 to a data output, and provide decoded control information to a processor 580, or memory 582.

The processor 580 may in some cases execute stored instructions to instantiate a node associating component 342 (see e.g., FIGS. 2 and 3) for communicating with base station 102 or other upstream nodes and/or for communicating with one or more DUs or other downstream nodes.

On the uplink (UL), at the UE 104, a transmit processor 564 may receive and process data from a data source. The transmit processor 564 may also generate reference symbols for a reference signal. The symbols from the transmit processor 564 may be precoded by a transmit MIMO processor 566 if applicable, further processed by the modulator/demodulators 554 and 555 (e.g., for SC-FDMA, etc.), and be transmitted to the base station 102 in accordance with the communication parameters received from the base station 102. At the base station 102, the UL signals from the UE 104 may be received by the antennas 534 and 535, processed by the modulator/demodulators 532 and 533, detected by a MIMO detector 536 if applicable, and further processed by a receive processor 538. The receive processor 538 may provide decoded data to a data output and to the processor 540 or memory 542.

The processor 540 may in some cases execute stored instructions to instantiate a node associating component 342 (see e.g., FIGS. 2 and 3) for communicating with one or more downstream UEs or IAB nodes 204.

The components of the UE 104 may, individually or collectively, be implemented with one or more ASICs adapted to perform some or all of the applicable functions in hardware. Each of the noted modules may be a means for performing one or more functions related to operation of the MIMO communication system 500. Similarly, the components of the base station 102 may, individually or collectively, be implemented with one or more ASICs adapted to perform some or all of the applicable functions in hardware.

Each of the noted components may be a means for performing one or more functions related to operation of the MIMO communication system 500.

The following aspects are illustrative only and aspects thereof may be combined with aspects of other embodiments or teaching described herein, without limitation.

Aspect 1 is a method of wireless communication including receiving, by a MT function of an IAB node, a first indication to migrate from a first IAB donor node associated with a first cell group and a first CU to a second IAB donor node associated with a second cell group and a second CU, performing, by the IAB node and based at least in part on receiving the first indication, a first random access procedure to connect to the second cell group associated with the second IAB donor node, establishing, by the IAB node in addition to a first DU function of the IAB node that serves a third cell group and based on performing the first random access procedure, a second DU function that serves a fourth cell group, and triggering, based on establishing the second DU function, a second random access procedure for a child node to migrate from the third cell group associated with the first DU function to the fourth cell group associated with the second DU function.

In Aspect 2, the method of Aspect 1 includes at least one of communicating, by the MT function of the IAB node with the first CU using a RRC connection or communicating, by the first DU function of the IAB node with the first CU using a F1-C connection.

In Aspect 3, the method of any of Aspects 1 or 2 includes where the child node is a MT function of a second IAB node or a UE.

In Aspect 4, the method of any of Aspects 1 to 3 includes where the first indication is part of a RRC reconfiguration message or a RRC connection reconfiguration message received from the first IAB donor node.

In Aspect 5, the method of any of Aspects 1 to 4 includes where the first cell group is a source cell group and the second cell group is a target cell group for handover, where performing the first random access procedure is part of performing handover from the first cell group to the second cell group, and further comprising releasing, based on performing handover from the first cell group to the second cell group, a connection with the first cell group.

In Aspect 6, the method of Aspect 5 includes communicating, by the IAB node, with a master cell group, where the first cell group and the second cell group are secondary cell groups.

In Aspect 7, the method of Aspect 6 includes receiving, from the master cell group, the first indication to migrate from the first IAB donor node to the second IAB donor node.

In Aspect 8, the method of any of Aspects 1 to 7 includes where the first cell group is a master cell group and the second cell group is a secondary cell group, where performing the first random access procedure is part of at least one of performing secondary cell addition to add the second cell group as the secondary cell group or performing switching of the first cell group to the secondary cell group and the second cell group to the master cell group.

In Aspect 9, the method of any of Aspects 1 to 8 includes communicating, by the IAB node, with a master cell group, where the first cell group and the second cell group are secondary cell groups, and where performing the first random access procedure is part of performing secondary cell addition to add the second cell group as an additional secondary cell group.

In Aspect 10, the method of any of Aspects 1 to 9 includes communicating, by the IAB node, with a master cell group, where the first cell group and the second cell group are secondary cell groups, and where performing the first random access procedure is part of activating the second cell group as a single active secondary cell group, and further comprising deactivating the first cell group as the single active secondary cell group.

In Aspect 11, the method of Aspect 10 includes receiving, from the master cell group, the first indication to activate the second cell group as the single active secondary cell group.

In Aspect 12, the method of any of Aspects 1 to 11 includes where the IAB node includes one or more additional MT functions.

In Aspect 13, the method of any of Aspects 1 to 12 includes where the first indication indicates one or more conditions for migrating from the first IAB donor node to the second IAB donor node.

In Aspect 14, the method of Aspect 13 includes where the one or more conditions are based on measured signal quality of one or more of the first cell group or the second cell group.

In Aspect 15, the method of any of Aspects 1 to 14 includes where switching from the first DU function to the second DU function includes broadcasting, by the IAB node, a second PCI of the fourth cell group associated with the second DU function that is different from a first PCI of the third cell group associated with the first DU function.

In Aspect 16, the method of any of Aspects 1 to 15 includes where switching from the first DU function to the second DU function includes broadcasting, by the IAB node, a second cell global identity associated with a first cell of the fourth cell group that is different from a first cell global identity that is associated with a second cell of the third cell group.

In Aspect 17, the method of Aspect 16 includes where the second cell global identity includes a NR cell identifier, a gNB identifier, a local cell identifier, or a PLMN identifier associated with the second IAB donor node.

In Aspect 18, the method of any of Aspects 1 to 17 includes broadcasting, by the JAB node, a first identifier of the first cell group and a second identifier of the second cell group after switching from the first DU function to the second DU function.

In Aspect 19, the method of any of Aspects 1 to 18 includes where switching from the first DU function to the second DU function is based at least in part on a master node to secondary node switch of the MT function of the IAB node.

In Aspect 20, the method of any of Aspects 1 to 19 includes receiving, from the first IAB donor node or the second IAB donor node and by the IAB node, a second indication to switch from the first DU function to the second DU function, wherein the one or more processors are configured to execute the instructions to cause the apparatus to switch from the first DU function to the second DU function, and trigger the child node to migrate from the third cell group associated with the first DU function to the fourth cell group associated with the second DU function further based at least in part on the second indication.

In Aspect 21, the method of Aspect 20 includes where triggering the child node to migrate from the third cell group to the fourth cell group comprises triggering the child node to handover from the third cell group to the fourth cell group.

In Aspect 22, the method of Aspect 21 includes where the third cell group and the fourth cell group are secondary cell groups configured for the child node, and further comprising receiving, for the child node, an indication to release the third cell group.

In Aspect 23, the method of any of Aspects 20 to 22 includes forwarding the second indication to the child node, where the second indication indicates one or more conditions for migrating the child node from the first IAB donor node to the second IAB donor node.

In Aspect 24, the method of Aspect 23 includes where the one or more conditions are based on measured signal quality of one or more of the third cell group or the fourth cell group.

Aspect 25 is an apparatus for wireless communication including a transceiver, a memory configured to store instructions, and one or more processors communicatively coupled with the memory and the transceiver, where the one or more processors are configured to execute the instructions to cause the apparatus to perform one or more of the methods of any of Aspects 1 to 24.

Aspect 26 is an apparatus for wireless communication including means for performing one or more of the methods of any of Aspects 1 to 24.

Aspect 27 is a computer-readable medium including code executable by one or more processors for wireless communications, the code including code for performing one or more of the methods of any of Aspects 1 to 24.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
a transceiver;
a memory configured to store instructions; and
one or more processors communicatively coupled with the memory and the transceiver, wherein the one or more processors are configured to execute the instructions to cause the apparatus to:
receive, by a mobile termination (MT) function, a first indication to migrate from a first IAB donor node that serves the apparatus via a first cell group provided by a first central unit (CU) to a second IAB donor node for serving the apparatus via a second cell group provided by a second CU;

perform, based at least in part on receiving the first indication, a first random access procedure to connect to the second cell group associated with the second IAB donor node;

establish, in addition to a first distributed unit (DU) function of the apparatus that provides a third cell group for serving one or more child nodes and based on performing the first random access procedure, a second DU function of the apparatus that provides a fourth cell group for serving the one or more child nodes; and trigger, based on establishing the second DU function, a second random access procedure for a child node to migrate from the third cell group provided by the first DU function to be served by the fourth cell group provided by the second DU function.

2. The apparatus of claim 1, wherein the one or more processors are further configured to execute the instructions to cause the apparatus to at least one of communicate, by the MT function of the IAB node with the first CU using a radio resource control (RRC) connection or communicate, by the first DU function, with the first CU using a F1-C connection.

3. The apparatus of claim 1, wherein the child node is a MT function of a second IAB node or a user equipment (UE).

4. The apparatus of claim 1, wherein the first indication is part of a radio resource control (RRC) reconfiguration message or a RRC connection reconfiguration message received from the first IAB donor node.

5. The apparatus of claim 1, wherein the first cell group is a source cell group and the second cell group is a target cell group for handover, wherein the one or more processors are configured to execute the instructions to cause the apparatus to perform the first random access procedure as part of performing handover from the first cell group to the second cell group, and wherein the one or more processors are further configured to execute the instructions to cause the apparatus to release, based on performing handover from the first cell group to the second cell group, a connection with the first cell group.

6. The apparatus of claim 5, wherein the one or more processors are further configured to execute the instructions to cause the apparatus to communicate with a master cell group, wherein the first cell group and the second cell group are secondary cell groups.

7. The apparatus of claim 6, wherein the one or more processors are further configured to execute the instructions to cause the apparatus to receive, from the master cell group, the first indication to migrate from the first IAB donor node to the second IAB donor node.

8. The apparatus of claim 1, wherein the first cell group is a master cell group and the second cell group is a secondary cell group, wherein the one or more processors are configured to execute the instructions to cause the apparatus to perform the first random access procedure as part of at least one of performing secondary cell addition to add the second cell group as the secondary cell group or performing switching of the first cell group to the secondary cell group and the second cell group to the master cell group.

9. The apparatus of claim 1, wherein the one or more processors are further configured to execute the instructions to cause the apparatus to communicate with a master cell group, wherein the first cell group and the second cell group are secondary cell groups, and wherein the one or more processors are configured to execute the instructions to cause the apparatus to perform the first random access procedure as part of performing secondary cell addition to add the second cell group as an additional secondary cell group.

10. The apparatus of claim 1, wherein the one or more processors are further configured to execute the instructions to cause the apparatus to communicate with a master cell group, wherein the first cell group and the second cell group are secondary cell groups, and wherein the one or more processors are configured to execute the instructions to cause the apparatus to perform the first random access procedure as part of activating the second cell group as a single active secondary cell group, and further comprising deactivating the first cell group as the single active secondary cell group.

11. The apparatus of claim 10, wherein the one or more processors further are configured to execute the instructions to cause the apparatus to receive, from the master cell group, the first indication to activate the second cell group as the single active secondary cell group.

12. The apparatus of claim 1, wherein the apparatus includes one or more additional MT functions.

13. The apparatus of claim 1, wherein the first indication indicates one or more conditions for migrating from the first IAB donor node to the second IAB donor node.

14. The apparatus of claim 13, wherein the one or more conditions are based on measured signal quality of one or more of the first cell group or the second cell group.

15. The apparatus of claim 1, wherein the one or more processors are configured to execute the instructions to cause the apparatus to switch from the first DU function to the second DU function at least in part by broadcasting a second physical cell identifier (PCI) of the fourth cell group associated with the second DU function that is different from a first PCI of the third cell group associated with the first DU function.

16. The apparatus of claim 1, wherein the one or more processors are configured to execute the instructions to cause the apparatus to switch from the first DU function to the second DU function at least in part by broadcasting a second cell global identity associated with a first cell of the fourth cell group that is different from a first cell global identity that is associated with a second cell of the third cell group.

17. The apparatus of claim 16, wherein the second cell global identity includes a NR cell identifier, a gNB identifier, a local cell identifier, or a public land mobile network (PLMN) identifier associated with the second IAB donor node.

18. The apparatus of claim 1, wherein the one or more processors are further configured to execute the instructions to cause the apparatus to broadcast a first identifier of a cell of the third cell group and a second identifier of a cell of the fourth cell group after switching from the first DU function to the second DU function.

19. The apparatus of claim 1, wherein the one or more processors are configured to execute the instructions to cause the apparatus to switch from the first DU function to the second DU function based at least in part on a master node to secondary node switch of the MT function.

20. The apparatus of claim 1, wherein the one or more processors are further configured to execute the instructions to cause the apparatus to receive, from the first IAB donor node or the second IAB donor node, a second indication to switch from the first DU function to the second DU function, wherein the one or more processors are configured to execute the instructions to cause the apparatus to switch from the first DU function to the second DU function, and trigger the child node to migrate from the third cell group associated with the first DU function to the fourth cell group associated with the second DU function further based at least in part on the second indication.

21. The apparatus of claim 20, wherein the one or more processors are configured to execute the instructions to cause the apparatus to trigger the child node to migrate from the third cell group to the fourth cell group at least in part by triggering the child node to handover from the third cell group to the fourth cell group.

22. The apparatus of claim 21, wherein the third cell group and the fourth cell group are secondary cell groups configured for the child node, and wherein the one or more processors are further configured to execute the instructions to cause the apparatus to receive, for the child node, an indication to release the third cell group.

23. The apparatus of claim 20, wherein the one or more processors are further configured to execute the instructions to cause the apparatus to forward a third indication to the child node, wherein the third indication indicates to the child node to migrate to a cell of the fourth cell group associated with the second DU function.

24. The apparatus of claim 23, wherein the third indication is based on one or more conditions related to measured signal quality of one or more of the third cell group or the fourth cell group.

25. A method of wireless communication, comprising:
  receiving, by a mobile termination (MT) function of an integrated access and backhaul (IAB) node, a first indication to migrate from a first IAB donor node that serves the IAB node via a first cell group provided by a first central unit (CU) to a second IAB donor node for serving the IAB node via a second cell group provided by a second CU;
  performing, by the IAB node and based at least in part on receiving the first indication, a first random access procedure to connect to the second cell group associated with the second IAB donor node;
  establishing, by the IAB node in addition to a first distributed unit (DU) function of the IAB node that provides a third cell group for serving one or more child nodes and based on performing the first random access procedure, a second DU function that provides a fourth cell group for serving the one or more child nodes; and
  triggering, based on establishing the second DU function, a second random access procedure for a child node to migrate from the third cell group provided by the first DU function to be served by the fourth cell group provided by the second DU function.

26. The method of claim 25, further comprising at least one of communicating, by the MT function of the IAB node with the first CU using a radio resource control (RRC) connection or communicating, by the first DU function of the IAB node with the first CU using a F1-C connection.

27. An apparatus for wireless communication, comprising:
  means for receiving, by a mobile termination (MT) function, a first indication to migrate from a first IAB donor node that serves the apparatus via a first cell group provided by a first central unit (CU) to a second IAB donor node for serving the apparatus via a second cell group provided by a second CU;
  means for performing, based at least in part on receiving the first indication, a first random access procedure to connect to the second cell group associated with the second IAB donor node;
  means for establishing, in addition to a first distributed unit (DU) function of the apparatus that provides a third cell group for serving one or more child nodes and based on performing the first random access procedure, a second DU function of the apparatus that provides a fourth cell group for serving the one or more child nodes; and
  means for triggering, based on establishing the second DU function, a second random access procedure for a child node to migrate from the third cell group provided by the first DU function to be served by the fourth cell group provided by the second DU function.

28. The apparatus of claim 27, further comprising means for at least one of communicating, by the MT function, with the first CU using a radio resource control (RRC) connection or communicating, by the first DU function of the IAB node with the first CU using a F1-C connection.

29. A non-transitory computer-readable medium, comprising code executable by one or more processors for wireless communications, the code comprising code for:
  receiving, by a mobile termination (MT) function of an integrated access and backhaul (IAB) node, a first indication to migrate from a first IAB donor node that serves the IAB node via a first cell group provided by a first central unit (CU) to a second IAB donor node for serving the IAB node via a second cell group provided by a second CU;
  performing, by the IAB node and based at least in part on receiving the first indication, a first random access procedure to connect to the second cell group associated with the second IAB donor node;
  establishing, by the IAB node in addition to a first distributed unit (DU) function of the IAB node that provides a third cell group for serving one or more child nodes and based on performing the first random access procedure, a second DU function that provides a fourth cell group for serving the one or more child nodes; and
  triggering, based on establishing the second DU function, a second random access procedure for a child node to migrate from the third cell group provided by the first DU function to be served by the fourth cell group provided by the second DU function.

30. The non-transitory computer-readable medium of claim 29, further comprising code for at least one of communicating, by the MT function of the IAB node with the first CU using a radio resource control (RRC) connection or communicating, by the first DU function of the IAB node with the first CU using a F1-C connection.

* * * * *